United States Patent
Tuero

(10) Patent No.: US 9,534,540 B2
(45) Date of Patent: Jan. 3, 2017

(54) THRUST ENABLING OBJECTIVE SYSTEM

(71) Applicant: Jose Antonio Tuero, Hallandale Beach, FL (US)

(72) Inventor: Jose Antonio Tuero, Hallandale Beach, FL (US)

(73) Assignee: Ryan Christopher Tuero, Hallandale Beach, FL (US)

( * ) Notice: Subject to any disclaimer, the term of this patent is extended or adjusted under 35 U.S.C. 154(b) by 86 days.

(21) Appl. No.: 14/265,388

(22) Filed: Apr. 30, 2014

(65) Prior Publication Data

US 2015/0315967 A1    Nov. 5, 2015

(51) Int. Cl.

| F02C 7/057 | (2006.01) |
| F02C 7/25 | (2006.01) |
| B64D 25/00 | (2006.01) |
| B64D 31/06 | (2006.01) |
| F02C 7/05 | (2006.01) |
| B64D 45/00 | (2006.01) |

(52) U.S. Cl.
CPC ............... *F02C 7/25* (2013.01); *B64D 25/00* (2013.01); *B64D 31/06* (2013.01); *F02C 7/05* (2013.01); *F02C 7/057* (2013.01); *B64D 2045/0095* (2013.01); *F05D 2220/323* (2013.01); *F05D 2230/80* (2013.01); *F05D 2270/09* (2013.01); *F05D 2270/44* (2013.01); *F05D 2270/805* (2013.01)

(58) Field of Classification Search
CPC ............ F02C 7/042; F02C 7/047; F02C 7/05; F02C 7/055; F02C 7/052; B64D 33/02; B64D 2033/022; B64D 2033/0233; F05B 2260/63
See application file for complete search history.

(56) References Cited

U.S. PATENT DOCUMENTS

| 2,847,855 | A | * | 8/1958 | Berger | G01S 1/02 244/3.17 |
| 3,298,637 | A | * | 1/1967 | Lee | F02C 7/05 244/53 B |
| 3,602,207 | A | * | 8/1971 | Kilmer | F02N 11/0803 123/179.1 |
| 5,001,650 | A | * | 3/1991 | Francis | G01S 3/7864 348/164 |
| 5,448,881 | A | * | 9/1995 | Patterson | F04D 27/02 415/26 |
| 5,479,350 | A | * | 12/1995 | Barakchi | F01D 17/085 324/115 |
| 7,871,455 | B1 | * | 1/2011 | Sands | B64D 33/02 244/53 B |
| 8,516,785 | B2 | * | 8/2013 | Brown | B64D 33/02 137/15.1 |

(Continued)

*Primary Examiner* — Tien Dinh
*Assistant Examiner* — Christopher Hutchens

(57) ABSTRACT

An automatic emergency radar and proximity sensor activated protection system that could assist to prevent commercial, private, or military aircraft jet engines from being damaged or destroyed by the installment of a Shielding Blade Assembly which will immediately close when detection of objects such as; birds, debris, or other destructive elements try to enter through the engine intake while the aircraft is in FLIGHT causing the Internal Air Injection Unit (A.I.U.) to supply high volumes of air in order for the engine to stay operational and prevent it from stalling while in FLIGHT.

3 Claims, 12 Drawing Sheets

(56) References Cited

U.S. PATENT DOCUMENTS

| | | | |
|---|---|---|---|
| 8,528,312 B1* | 9/2013 | Shammoh | B64D 33/02 |
| | | | 415/121.2 |
| 2004/0144097 A1* | 7/2004 | Grimlund | F02C 7/042 |
| | | | 60/772 |
| 2007/0044787 A1* | 3/2007 | Brice | A01K 1/0058 |
| | | | 126/91 A |
| 2009/0207006 A1* | 8/2009 | Richter | G01S 7/52004 |
| | | | 340/435 |

* cited by examiner

THRUST ENABLING OBJECTIVE SYSTEM

BACKGROUND OF THE INVENTION

For as long as the jet engine has existed, it has always been plagued by the uncertainty that at any given moment while in flight, the engine or engines of an aircraft could be compromised by external forces. This could normally occur at takeoff when aircraft are most vulnerable to things such as bird strikes or loose debris picked up off the runway. Severe weather fronts containing heavy snow and ice, large hail, or wind shear can be destructive to any jet engine.

Currently, most of the more sophisticated jet engines have ice breakers located on the front intake of the main engine section. Deicing and heating systems are also part of similar designs. Unfortunately those preventive systems can only do a fraction of the job and may not be enough when something more overwhelming is about to compromise a jet engine during flight.

If an jet engine was to be equipped with a fully automated system that could detect incoming objects, be able to close and shield the intake of the engine, and alternatively supply air to the jet engine(s), then that is where the Thrust Enabling Objective System (T.E.O.S.) would come into play and could conceivably change the level of jet engine vulnerability making air travel safer for all.

BRIEF SUMMARY OF THE INVENTION

The importance of such an invention is to ensure the safety of a jet aircraft (commercial, private, or military) as well as those who are onboard while in flight by providing a system which automatically blocks out any object which would be destructive to the jet engine(s).

System could be activated automatically using an array of sophisticated sensors capable of detecting oncoming threats from long distances. Have the necessary safeguards to making certain that the only element going into the intake of the jet engine is air. To offer the same protective system to older existing jet engines still in operation while incorporate the same system when developing new jet engine designs.

BRIEF DESCRIPTION OF THE DRAWINGS

TEOS-001ThrustEnablingObjectivePresentation.pdf
Drawing Sheet 01/12:
FIG. 4 Front view aircraft shown with the engines closed, thrust enabling objective system on.
FIG. 16 Exploded right isometric view impeller cage assembly 53, internal components.

DETAILED DESCRIPTION OF THE INVENTION

Figure 3:
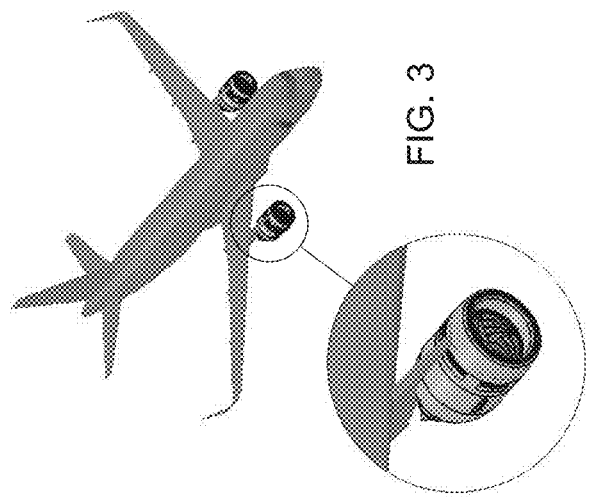
FIG. 3 Left isometric view, aircraft close up, right or starboard side engine.
Figure 1:
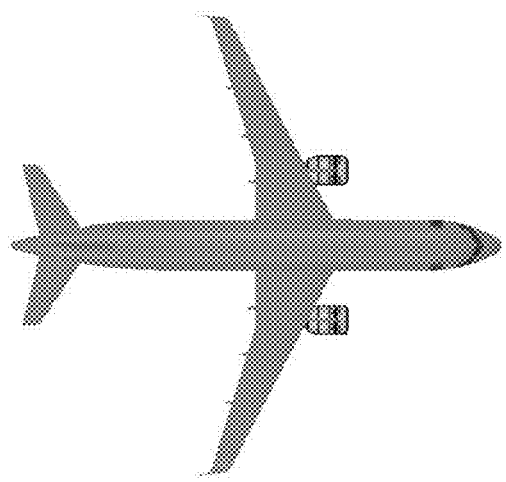
FIG. 1 Top view representing twin engine commercial aircraft with thrust enabling objective system installed.
Figure 2:
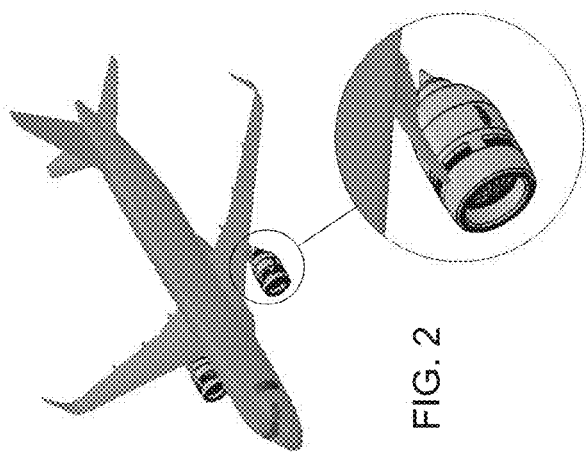
FIG. 2 Right isometric view, aircraft close up, left or port side engine.
Figure 5:
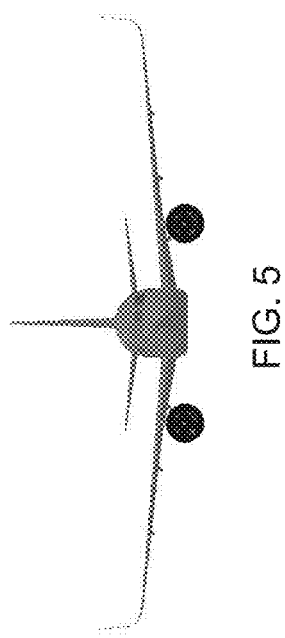
FIG. 5 Front view aircraft shown with the engines open, thrust enabling objective system off.
TEOS-002ProximitySensorArrayElectonics.pdf
Drawing Sheet 02/12.
Figure 4:
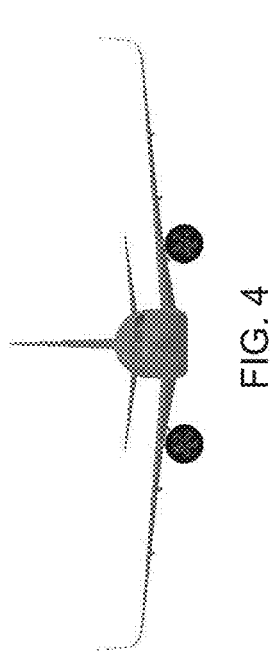
Figure 6:
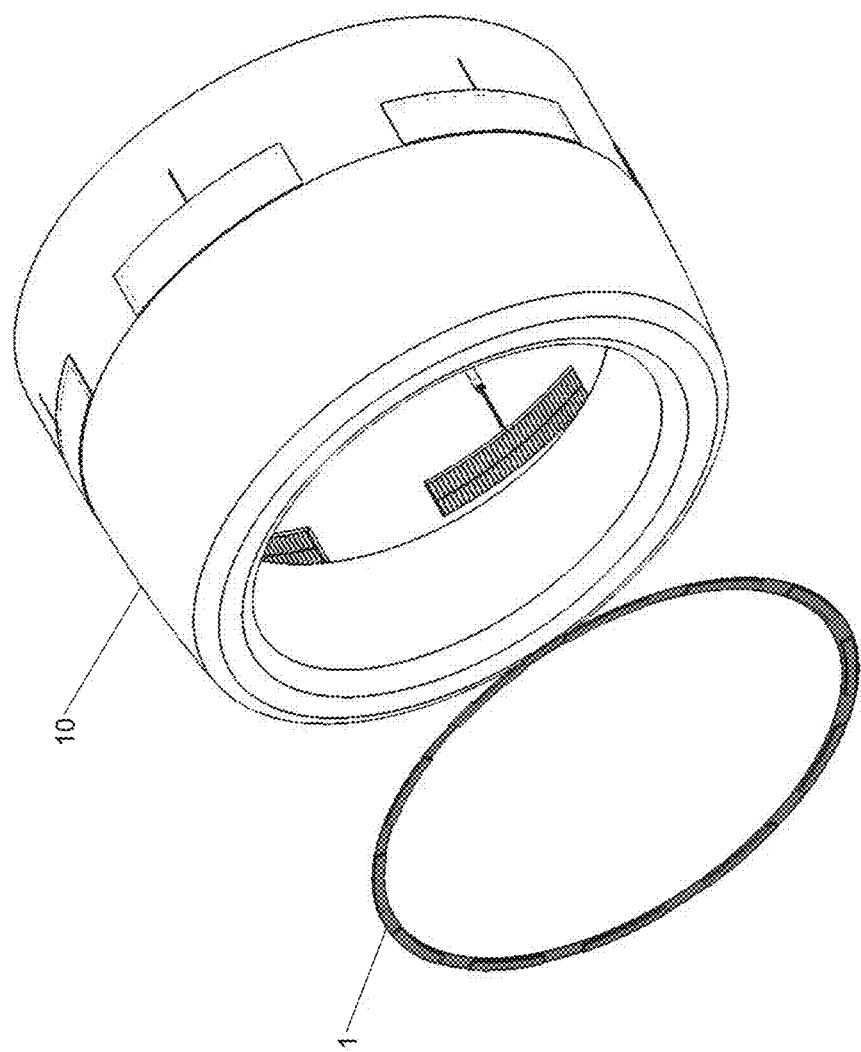
FIG. 6 Right isometric view showing physical location of Proximity Sensor Array 1, attached to front Extended Nacelle Assembly 10.
Drawing Sheet 03/12.
Figure 7:
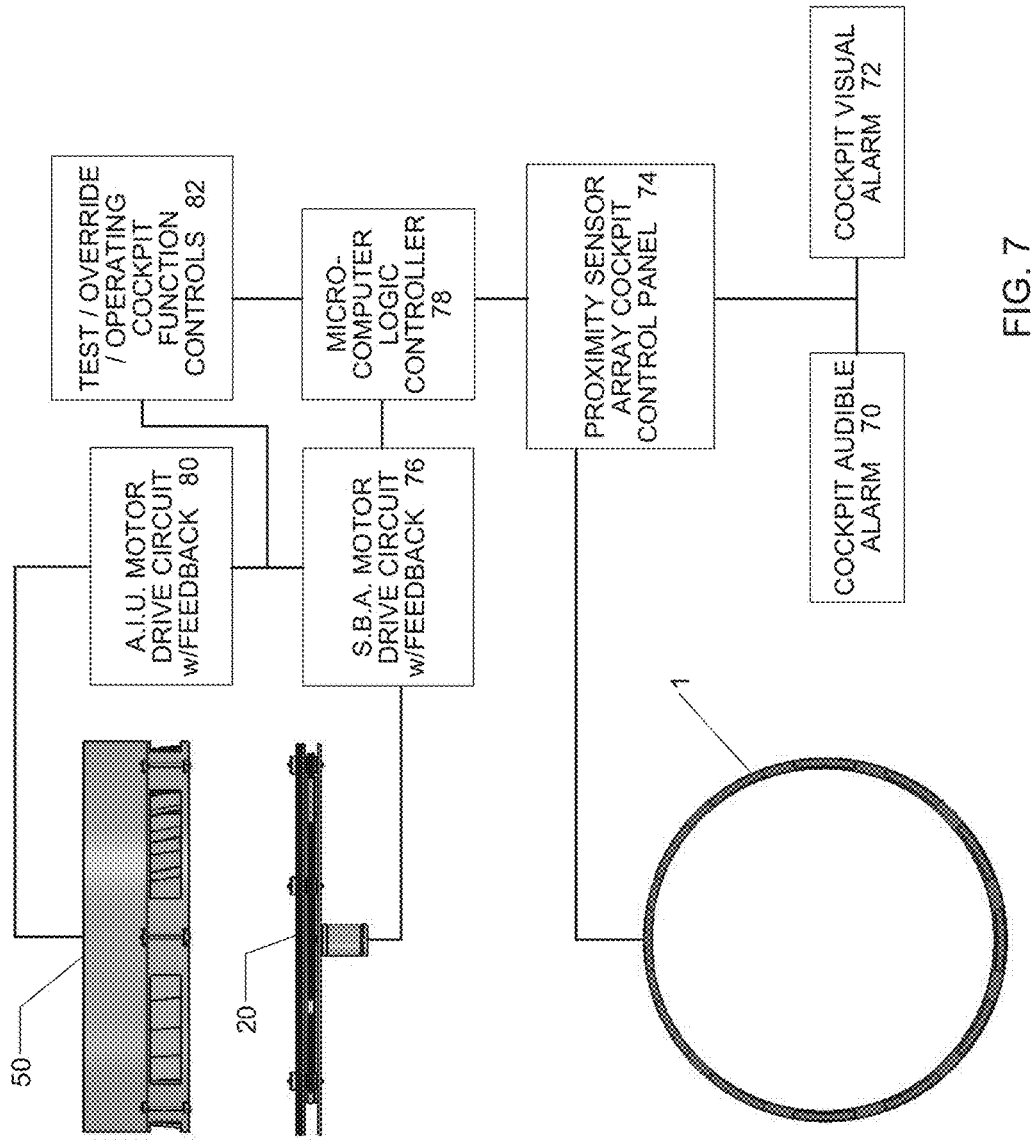
FIG. 7 Block diagram, proximity sensor array 1, to proximity sensor array cockpit control panel 74, cockpit audible alarm 70, cockpit visual alarm 72, to microcomputer logic controller 78 to test/override/operating function controls 82, to S.B.A. motor drive circuit with feedback 76, to shielding Blade Assembly 20, A.I.U. drive circuit with feedback 80, to internal air injection unit assembly 50.
TEOS-003ExtendedNacellewithAirIntakeAssembly.pdf
Drawing Sheet 04/12.

Proximity Sensor Array with Electronics:
TEOS-002ProximitySensorArrayElectronics.pdf
FIG. 6 Sheet 02/12:
Process of detecting any solid mass while in flight begins with the proximity sensor array 1, mounted annually around front air inlet, extended nacelle assembly 10.
FIG. 7 Sheet 03/12:
Proximity sensor array 1, electrically coupled to proximity sensor array cockpit control panel 74. Panel will house a frequency transducer to transmit continuous signal waves that when bounced off an object will reflect echoes back to proximity sensor array 1, where they are collected and translated by proximity sensor array cockpit control panel 74, into a real-time map showing both distance and time to possible impact. Both an audible 70, and visual 72, enunciators will alert cockpit crew.

When objects are within a strike distance, the microcomputer logic controller 78, will prepare jet engine for an impact. As part of the failsafe design, each jet engine on an aircraft will have its' own SBA (shielding blade assembly) motor drive circuit 76, so each engine can be activated only if the threat to that engine is real.

At the moment the shielding blade assembly 20, is activated, feedback from this unit will be transmitted back to the microcomputer logic controller 78, and the AIU (air injection unit) motor drive circuit 80, will power up and begin spinning the air injection unit 50, bringing outside air to supply jet engine and keep it from stalling during flight.

Cockpit crew attempting to override system will be locked out by a test/override/operating cockpit function controls 82. No shutdown permitted whether intentional or accidental. When system has been activated it will continue to function automatically until by which time the system detects no further threats and deactivates the override prevent functions when it is safe again.

Extended Nacelle with Air Intake Assembly:

TEOS-003Extended Nacelle with Air Intake Assembly.pdf

Figure 8:
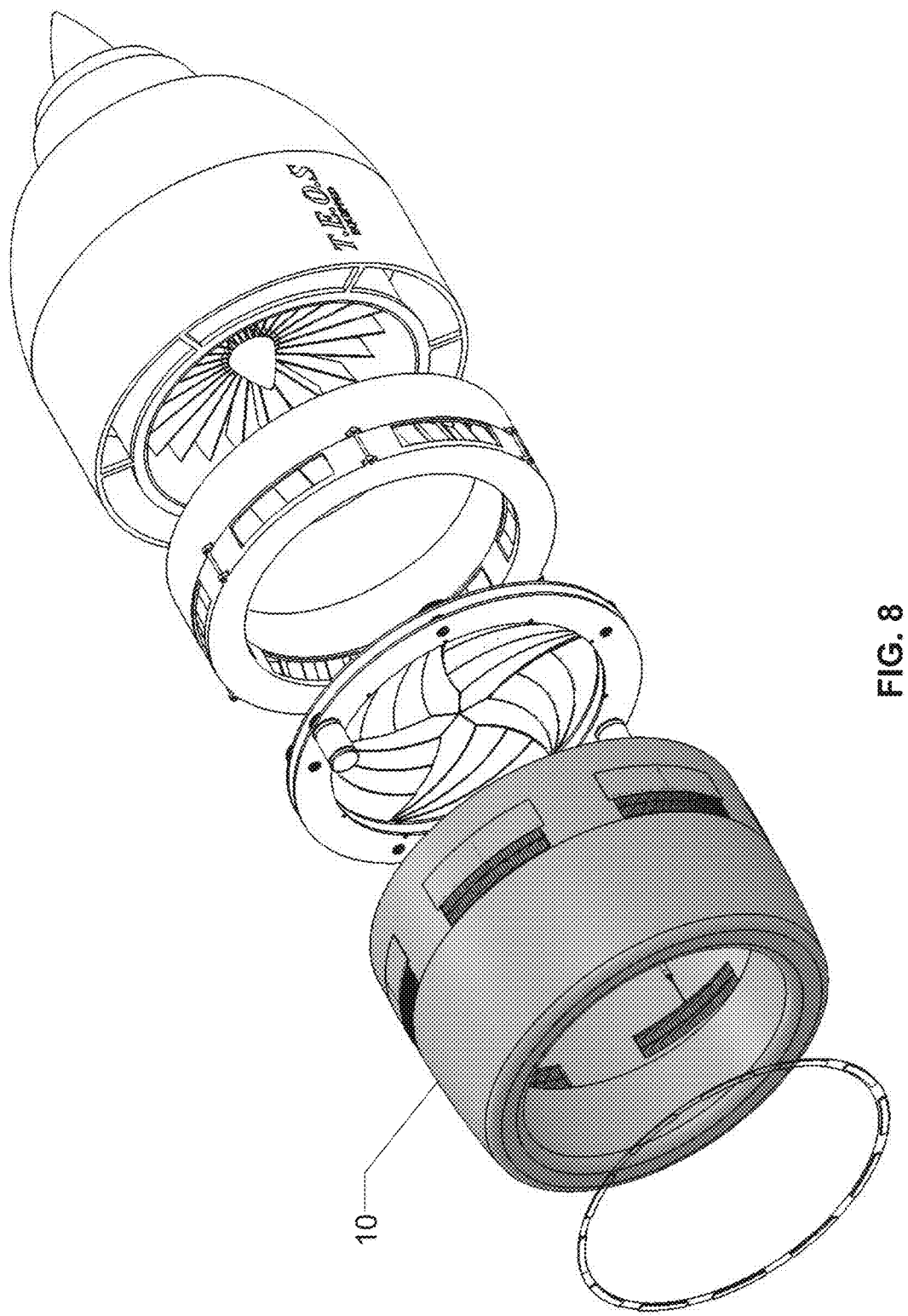
FIG. 8 Exploded right isometric view, engine components (outlined), extended nacelle assembly 10, (shaded), exterior air inlet doors 12, open.
Drawing Sheet 05/12.
Figure 10:
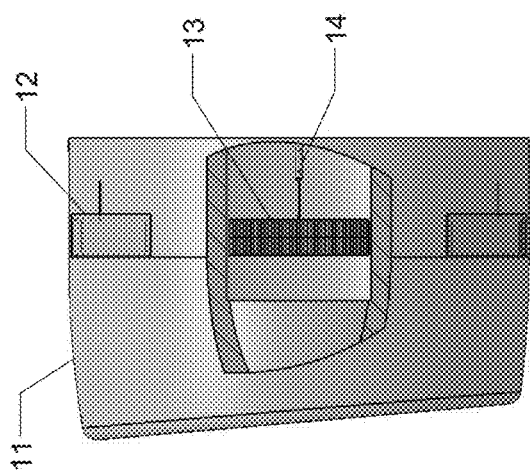
FIG. 10 Right side elevation cut-a-way view extended nacelle assembly 10, with extended nacelle housing 11, internal components 12, 13, 14.
TEOS-004ShieldingBladeAssembly.pdf
Drawing Sheet 06/12.

FIG. 8, Sheet 04/12:

The extended nacelle housing 11, part of the air intake assembly 10, will be primarily designed and fabricated by jet engine manufacturer to adapt the thrust enabling objective system to particular engine designs.

Figure 9:
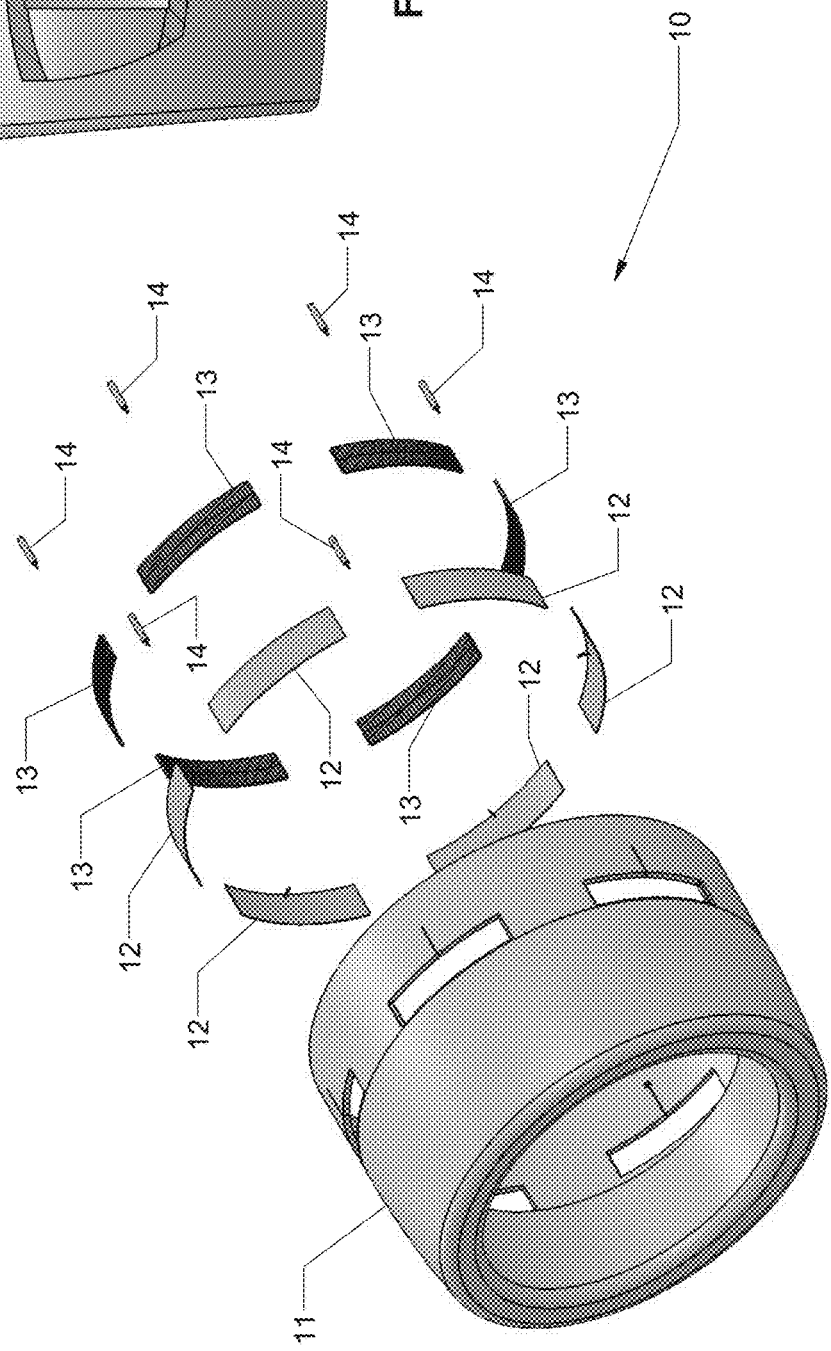
FIG. 9 Exploded right isometric view, extended nacelle assembly 10 components.
Figure 11:
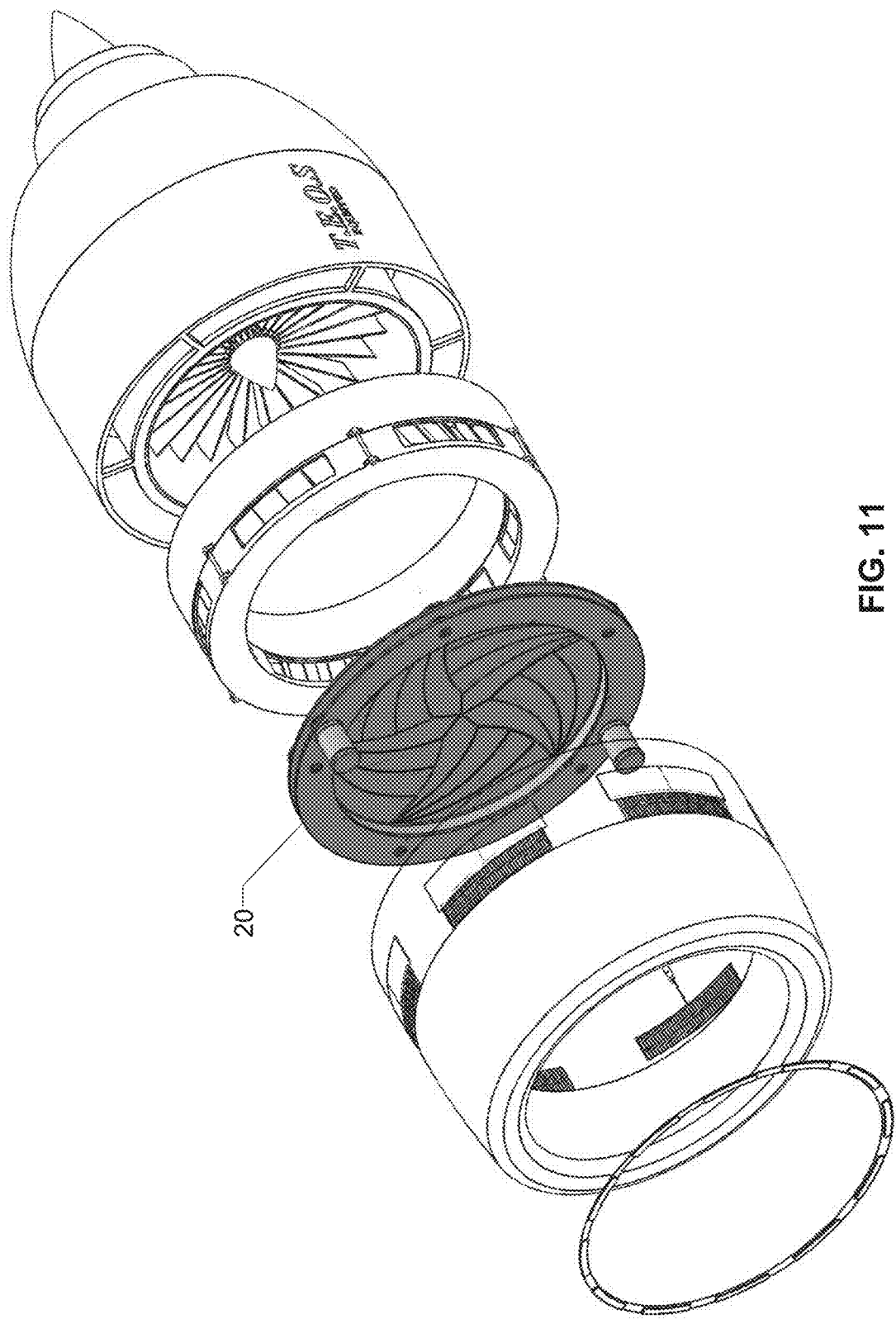
FIG. 11 Exploded right isometric view, engine components (outlined) shielding blade assembly 20, (shaded), closed.
Drawing Sheet 07/12.

FIG. 9, Sheet 05/12:

The extended nacelle housing 11, will have air entry ports located around its' exterior circumference. Each one of the air entry ports will be covered by an air entry door 12. Behind each air entry door 12, will be a replaceable multi-stage air filter 13.

Air entry doors will open and close with their own pneumatic/hydraulic linear actuator 14. All supply and return lines (not shown) will be routed in such a way where it will not interfere with the operation of other components associated to the thrust enabling objective system.

Shielding Blade Assembly:

TEOS-004Shielding Blade Assembly.pdf

Figure 12:
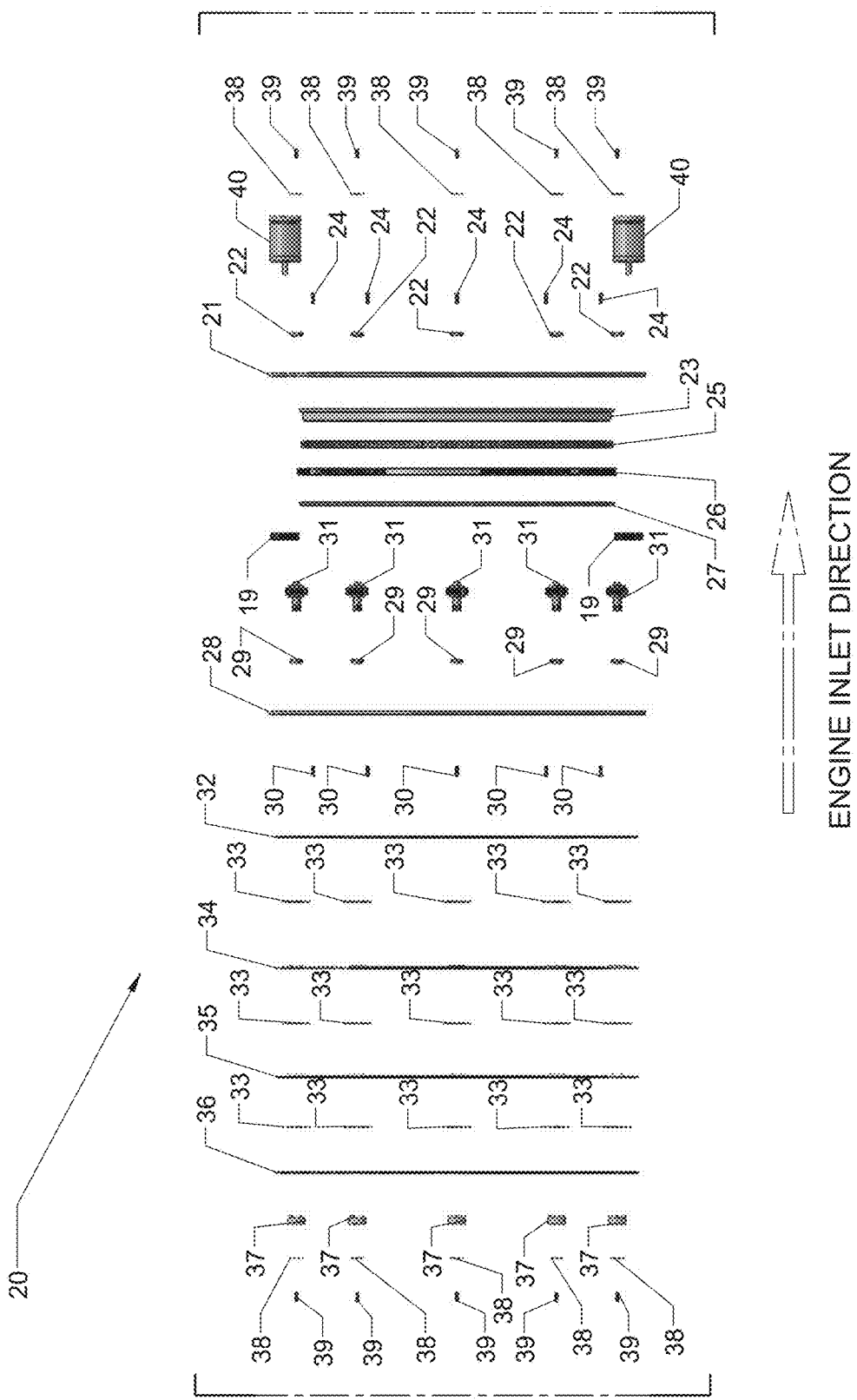
FIG. 12 Exploded right side elevation, shielding blade assembly 20, components.
Drawing Sheet 08/12.
Figure 13:
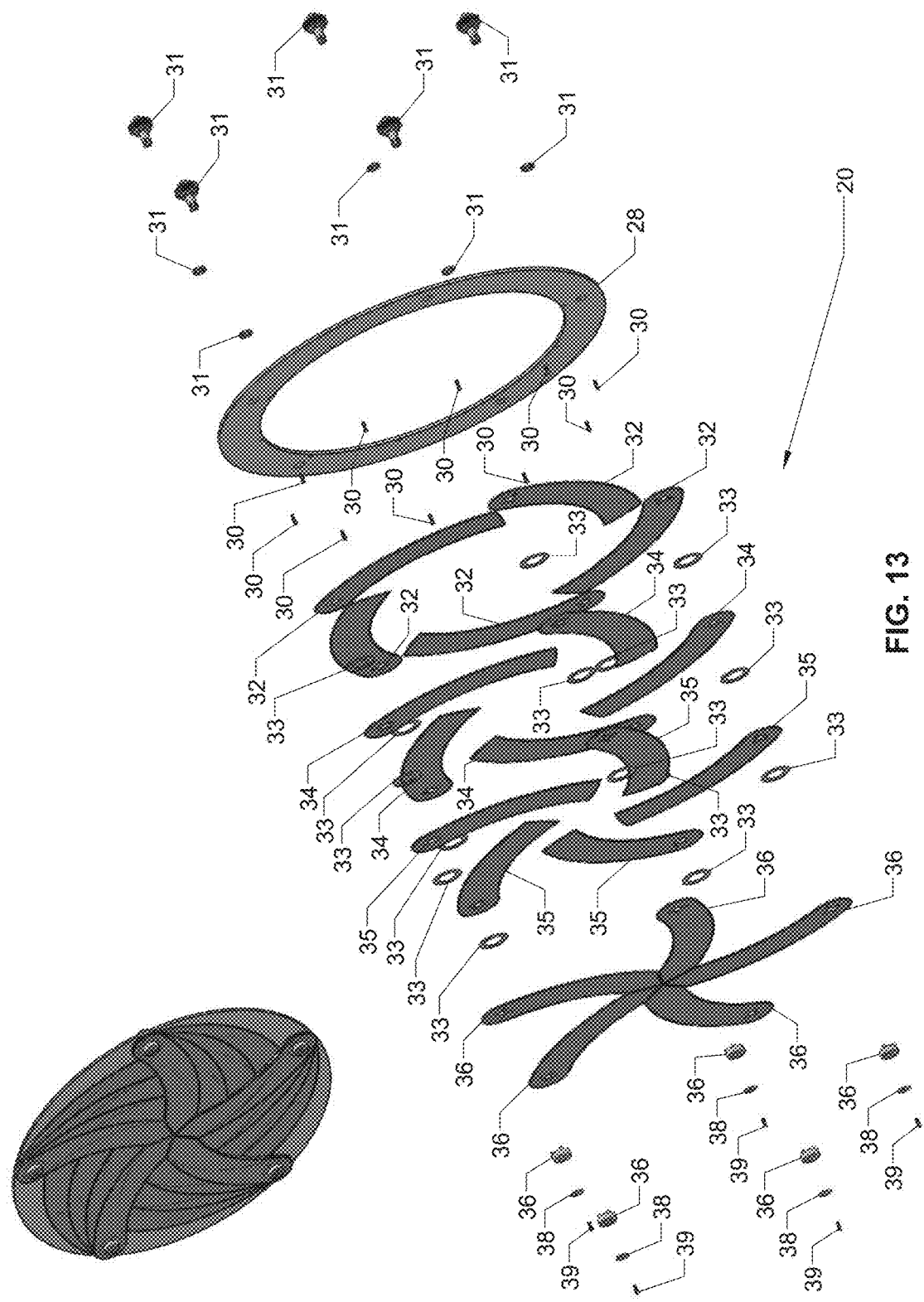
FIG. 13 Partial first section exploded right isometric view, shielding blade assembly 20, components.
Drawing Sheet 09/12.
Figure 14:
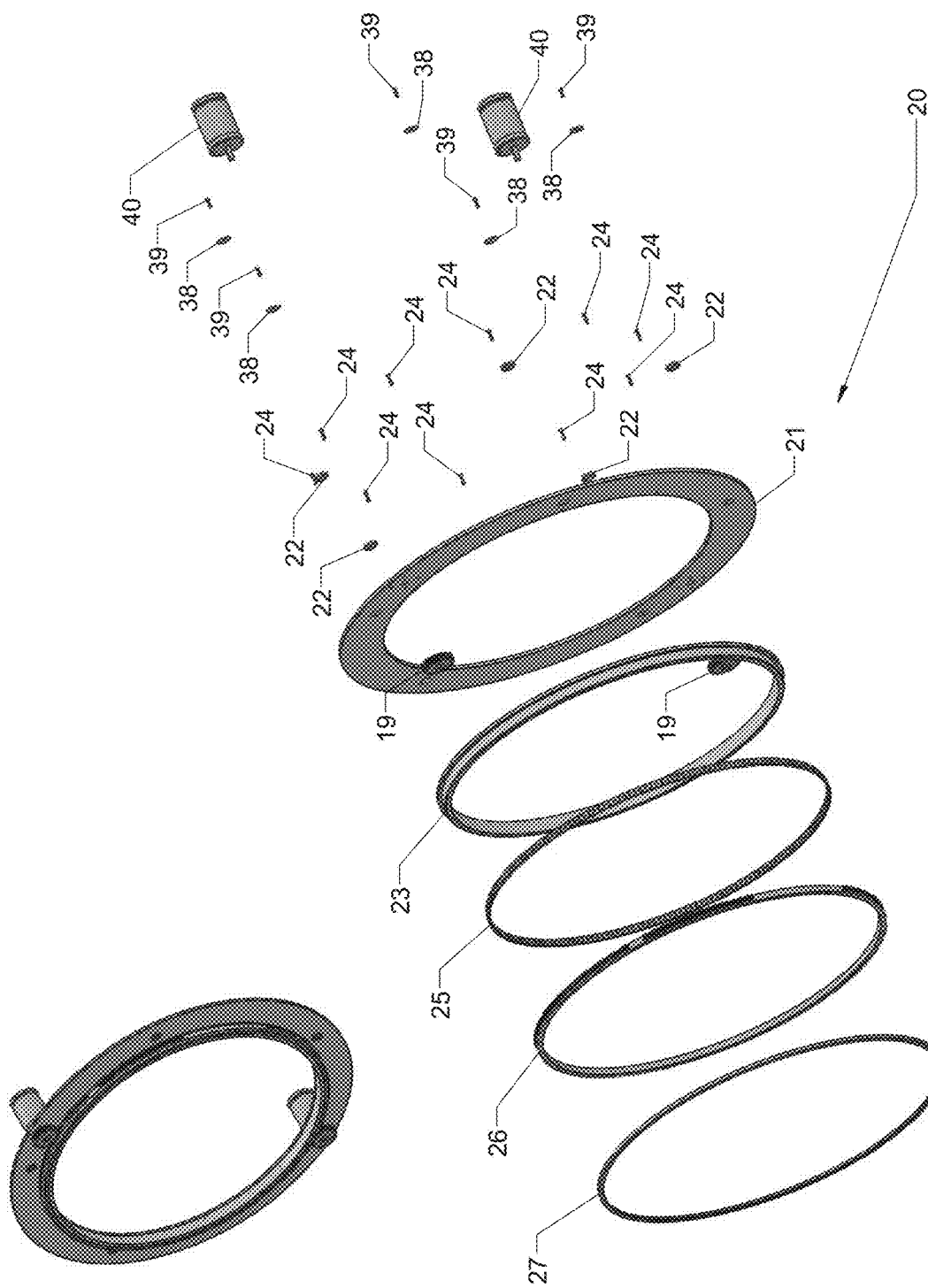
FIG. 14 Partial second section exploded right isometric view, shielding blade assembly 20, components.
TEOS-005InternalAirInjectionUnitAssembly.pdf
Drawing Sheet 10/12.
Figure 15:
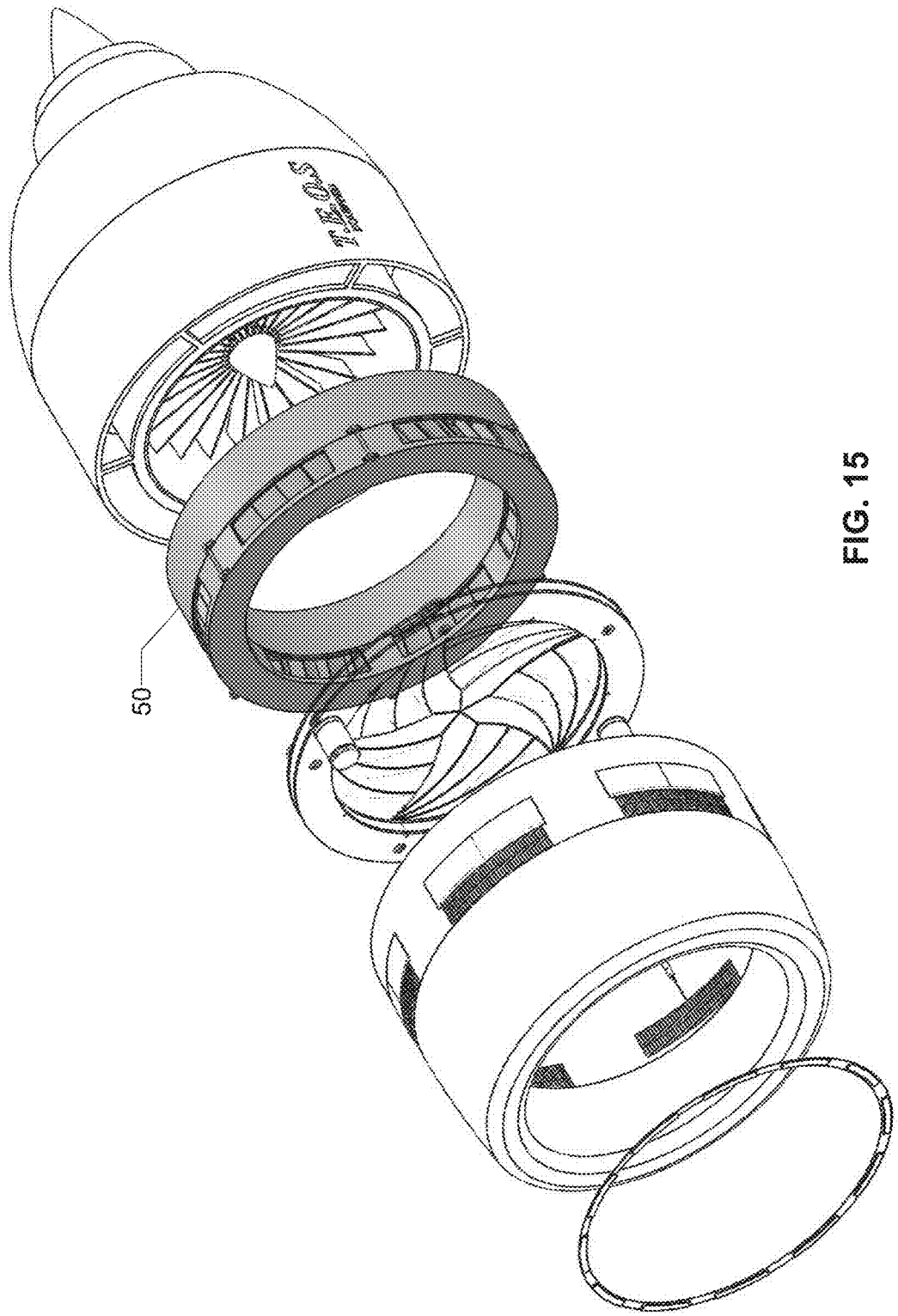
FIG. 15 Exploded right isometric view, engine components shielding blade assembly 20, (outlined) closed, Internal Air Injection Unit Assembly 50, (shaded).
Drawing Sheet 11/12.

FIG. 12 Sheet 07/12, FIG. 13 Sheet 08/12, FIG. 14 Sheet 9/12

Rear Mounting Ring 21, requires the installation of a Double Sealed Ball Bearing 22, at five locations around the ring before further assembly.

Press Main Drive Gear Oil-less Bearing 25, onto Center Support Hub 23.

Slip Main Drive Gear 26, over Main Drive Gear Oil-less Bearing 25, complete Center Support Hub 23, assembly by placing and temporarily retaining the Bearing Stop Ring 27, against Main Drive Gear 26.

Center Support Hub 23, positioned flange side up, inside face of the Rear Mounting Ring 21, placed against the flange side of Center Support Hub 23, secured with Socket Head Cap Screws 24 (refer to sheet 07/12 for total number of 24). Line up all threaded holes and clearance holes between parts.

Lay Rear Mounting Ring 21, with attached Center Support Hub 23, on rear face for the following steps.

The Front Mounting Ring 28 requires installation of a Double Sealed Ball Bearing 29, at five locations around the ring before further assembly.

locate 40 Tooth Driven Gear Pinion Assembly 31, into each of the five installed Double Sealed Ball Bearings 22, on the Rear Mounting Ring 21. Position Front Mounting Ring 28, against face of Center Support Hub 23, (side where Bearing Stop Ring 27 is installed.)

Make sure to remove any temporary retainers holding Bearing Stop Ring 27.

position Bearing Stop Ring 27 onto machined step of Center Support Hub 23. Make certain all 40 Tooth Driven Gear Pinion Assemblies 31 pass through mounted Double Sealed Ball Bearings 29. Front Mounting Ring 28 position flat against Bearing Stop Ring 27.

Socket Head Cap Screws 30, (refer to sheet 08/12 for total number of 30) fasten Front Mounting Ring 28, to Center Support Hub 23, Line up all threaded holes and clearance holes between parts as performed in previous step with Rear Mounting Ring 21.

Important Note:

40 Tooth Driven Gear Pinion Assemblies 31, to turn freely when Main Drive Gear 26, is spun on Center Support Hub 23.

Without moving the partially assembled Shielding Blade Assembly 20, place one $4^{th}$ Stage Blade 32, onto each of the five shafts of the 40 Tooth Driven Gear Pinion Assemblies 31. Place a Teflon Pancake Washer 33, on top of each of the $4^{th}$ Stage Blades 32. Repeat this operation for the $3^{rd}$ Stage Blades 34, followed by another Teflon Pancake Washer 33.

Continue with the $2^{nd}$ Stage Blades 35, followed by another Teflon Pancake Washer 33, and end with the $1^{st}$ Stage Blades 36.

(Make certain that blades lie concentrically between the inner and outer diameters of both Front Mounting Ring 28 and Rear Mounting Ring 21, that all raised drive coins on blades do not ride up, and seat correctly to contact drive slots).

With all Blade Assemblies in open (rest) position around Front Mounting Ring 28, and Rear Mounting Ring 21, install a Drive Cog 37, onto each shaft of 40 Tooth Driven Gear Pinion Assemblies 31. Each Drive Cog is keyed and has protruding drive cogs on the back side that must be located correctly and must secure each of the (5) sets of 4 blades onto 40 Tooth Driven Gear Pinion Assemblies 31.

Secure each Drive Cog by placing a Thrust Washer 38 on top and bolt each Drive Cog to the end of the 40 Tooth Driven Gear Pinion Assemblies 31, with Socket Head Cap Screws 39.

Using an overhead crane or suitable lifting mechanism, pick up partially assembled Shielding Blade Assembly 20, place it vertically where it is accessible for mounting next components.

Place a Drive Motor 40, into each mounting hole located on the top and bottom of Rear Mounting Ring 21. Secure with required hardware (not shown) and then place a 52 Tooth Motor Drive Gear 19, on each Drive Motor 40. Secure Motor Drive Gear 19, with appropriate hardware as required and specified by the motor manufacturer (not shown).

completed Shielding Blade Assembly 20, will be supported in a manner that is to simulate same mounting apparatus that will be used to support the unit when mounted on a jet engine. Next step will be to fully test the assembled unit.

Power will be fed to activate and make certain that Drive Motors 40, operate smoothly, Main Drive Gear 26, rotates against the Oil less Bearing 25, without binding, that all 40 Tooth Driven Gear Pinion Assemblies 31, operate each of the (5) Stage Blade Assemblies 32, 34, 35, & 36, without binding or stalling.

Internal Air Injection Unit Assembly:

TEOS-005Internal Air Injection Unit Assembly.Pdf

Figure 16:
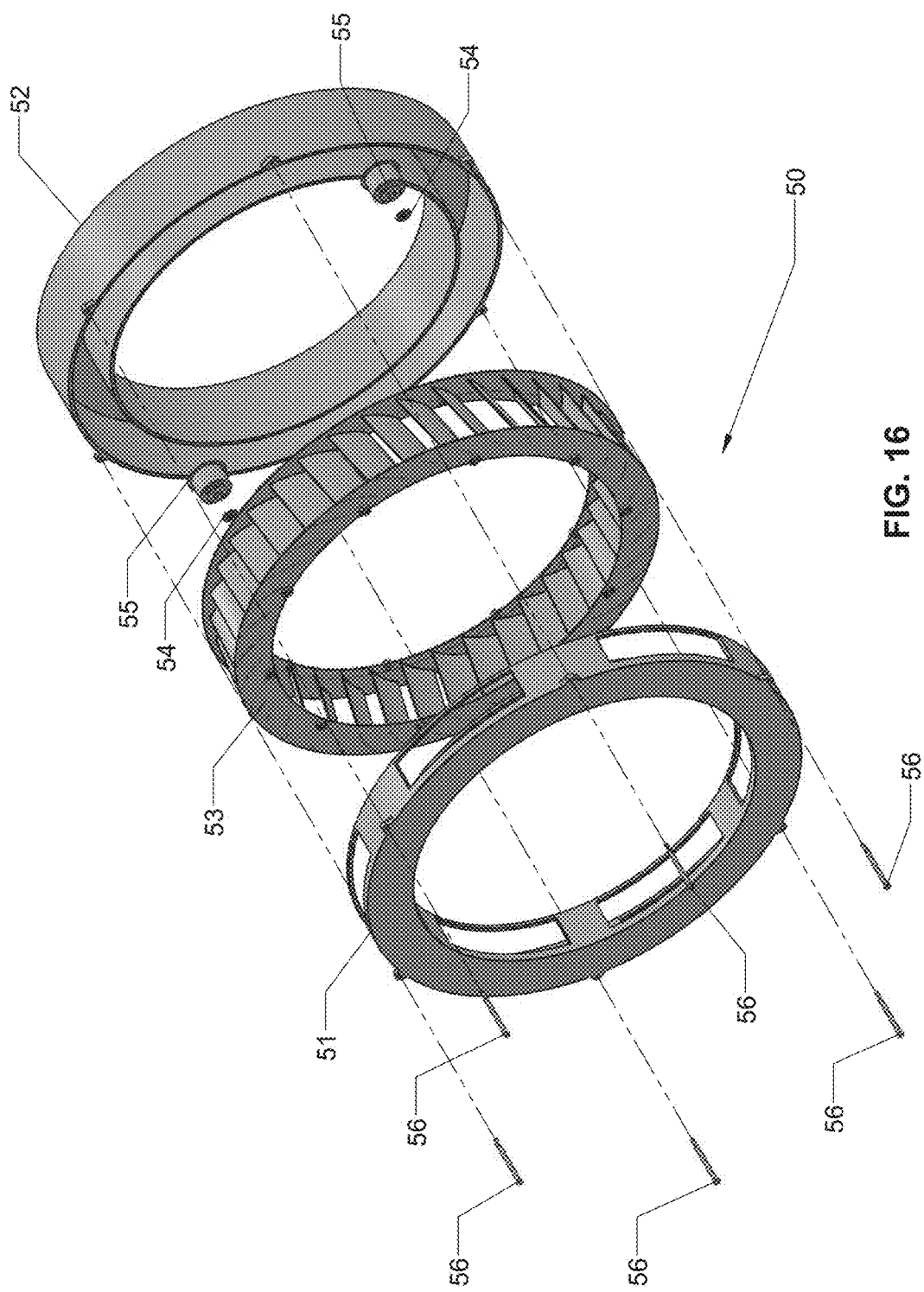
FIG. 16 Exploded right isometric view air injection unit assembly 50, main sub-assembly components.
Drawing Sheet 12/12.

FIG. 16 Sheet 11/12:

Begin by assembling two Low Profile Pancake Motors 55, by installing a High Speed Friction Drive 54, onto the output shaft of each motor making certain the High Speed Friction Drives are pressed in and seat correctly on the shafts and are perpendicular to the shaft ends.

Next place each Low Profile Pancake Motor 55, inside the Rear AIU Main Casing Half 52, and place all (8) mounting bolts (not shown) from the rear side of the Rear AIU Main Casing Half 52, but do not tighten since it will require that the motors be pushed up against the drive ring on the Rear Impeller Rail 58, when the Air Injection Impeller Cage Assembly 53, is positioned into the Rear AIU Main Casing Half 52.

Figure 17:
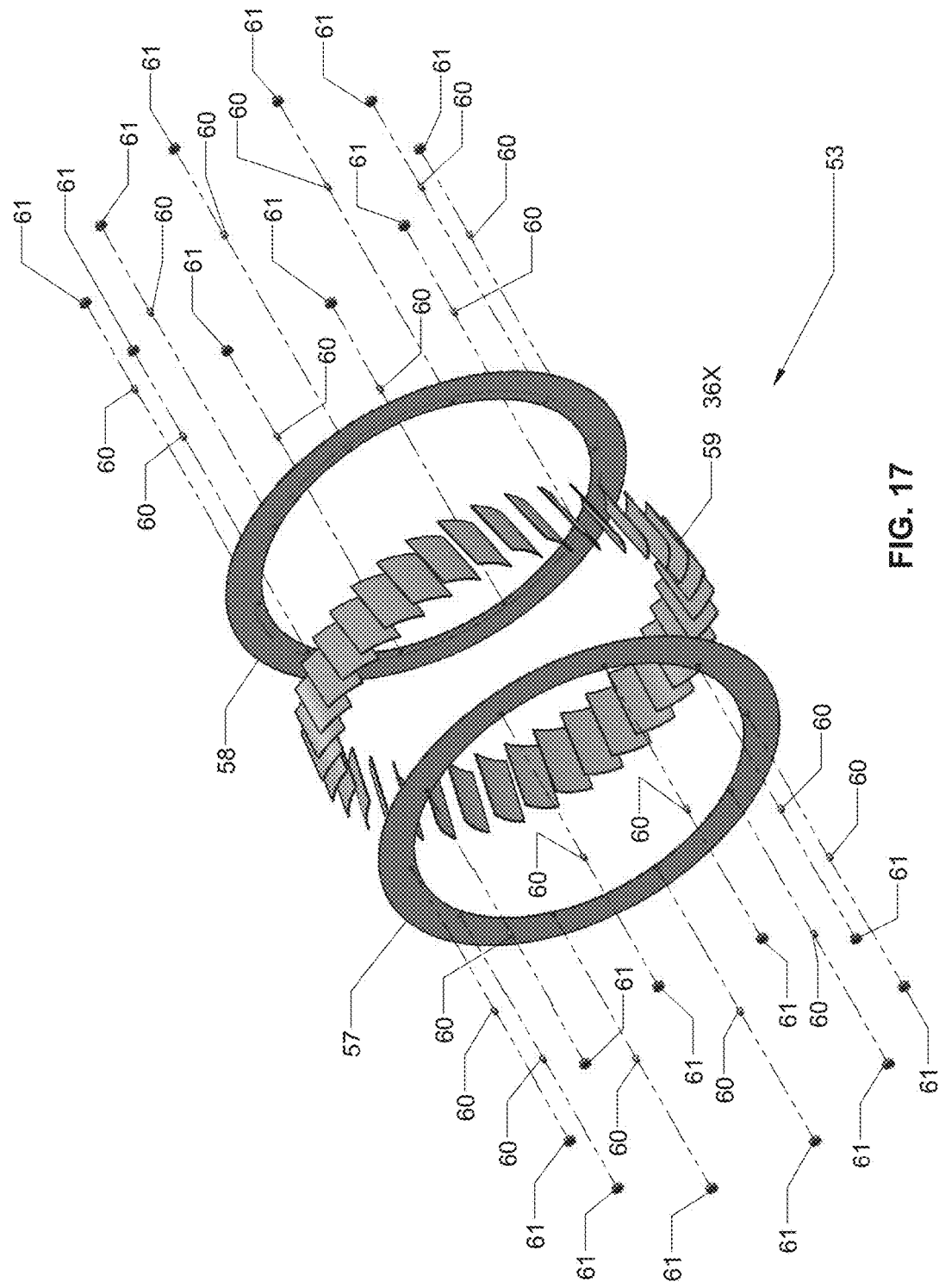

FIG. 17 Sheet 12/12:

Assemble the Air Injection Impeller Cage Assembly 53, by placing the Rear Impeller Rail 58, face down (alignment grooves facing down) on a flat horizontal surface.

Press Rail Cage Bearing Shaft 60, into each of the (10) holes on the Rear Impeller Rail 58, then press 3.00"×1.25"×1.00" Double Sealed Ball Bearings 61, onto each of the Rail Cage Bearing shafts 60.

Repeat the assembly procedure for the Front Impeller Rail 57, by first pressing Rail Cage Bearing Shaft 60, into each of the (10) holes on the Front Impeller Rail 57, and then pressing 3.00"×1.25"×1.00" Double Sealed Ball Bearings 61, onto each of the Rail Cage Bearing Shafts 60.

Take the Rear Impeller Rail 58, and turn it (alignment grooves facing up) and lay on a flat horizontal surface. Place the Intake Impeller Blades 59 one at a time into each of the (36) alignment grooves around the circular sector of the Rear Impeller Rail 58.

Fasten with the appropriate hardware required (not shown), then when all (36) Intake Impeller Blades are secured to the Rear Impeller Rail 58, place the Front Impeller Rail 57, on top of the open end of the Intake Impeller Blades 59, and fasten in the same manner as previously done with the Rear Impeller Rail 58. (Alignment grooves facing down, bearings facing towards you).

FIG. 16 Sheet 11/12:

Take the assembled Air Injection Impeller Cage Assembly 53, and place it concentrically within the Rear A.I.U. Main Casing Half 52. Make certain that all of the ball bearings installed on the Rear Impeller Rail 58, seat down into the roller groove on the Rear A.I.U. Main Casing Half 52.

Move both pancake motors previously installed inward until the High Speed Friction Drives 54, solidly contact the drive ring on the Rear Impeller Rail 58. Afterwards, tighten all (8) mounting bolts (not shown) sequentially until tight. Make sure that both of the High Speed Friction Drives 54, rotate freely when the Air Injection Impeller Cage Assembly 53, is spun manually.

Install "O" Ring Gasket (not shown) in groove of Rear A.I.U. Main Casing Half 52. Make certain that "O" Ring lays concentric within the groove and does not get rolled or pinched during the next step of assembly.

Place the Front A.I.U. Main Casing Half 51, on top of the partially assembled Rear A.I.U. Main Casing Half 52, and align all (12) of the retaining ears on both casing halves making sure that the "O" Ring does not get rolled or pinched and that the Double Sealed Ball Bearings 61, installed on the Front Cage Rail 57, seat into the roller groove of the Front A.I.U. Main Casing Half 51.

Secure the Front and Rear A.I.U. Main Casing Halves with 1.00"-14×15" long Hex Bolts 56, at (6) places by passing the body of the bolt through the retaining ears on the Front A.I.U. Main Casing Half 51, and screw the bolts into the threaded holes on the Rear A.I.U. Main Casing Half 52. Make sure to properly sequence the tightening of all bolts so to eliminate the possibly of stress cracking any one of the retaining ears.

Make certain that when assembled, the Intake Impeller Cage Assembly 53, can spin freely as it is turned manually. The completed Internal Air Injection Unit 50, should be tested by properly supporting the unit as it would be installed and powered up so that the Low Profile Pancake Motors 55, High Speed Friction Drives 54, and Air Injection Impeller Cage Assembly 53, spins freely with no noises or vibration caused by imbalanced components.

The invention claimed is:

1. An aircraft intake assembly comprising:
a nacelle with multiple intake side doors disposed on an outer periphery of the nacelle;
an internal air injection unit having controllable impeller blades arranged on an outer periphery of the internal air injection unit, the controllable impeller blades located adjacent to the respective intake side doors of the nacelle;
a shielding blade assembly having a stored configuration and an extended configuration;
the shielding blade assembly having blades that retract and overlap in the stored configuration and rotate inwardly towards a centerline of the aircraft intake assembly from the stored configuration to the extended configuration, the extended configuration providing an aerodynamically closed seal to prevent airflow from flowing through the centerline of the aircraft intake assembly;
a proximity sensor array for detecting incoming objects towards the aircraft intake assembly and transmitting signals in response to detecting said incoming objects to a controller that transmits command signals when detecting said incoming objects;
a motor assembly configured to rotate said blades from the stored configuration to the extended configuration in response to the controller transmitting the command signals to prevent said incoming objects from entering the internal air injection unit.

2. The aircraft intake assembly of claim 1, wherein the intake side doors of the nacelle further include air filters.

3. The aircraft intake assembly of claim 1, wherein the aircraft intake assembly is attached to an aircraft jet engine.

* * * * *